US010417051B2

(12) United States Patent
Behrendt et al.

(10) Patent No.: US 10,417,051 B2
(45) Date of Patent: Sep. 17, 2019

(54) SYNCHRONIZING SHARED RESOURCES IN AN ORDER PROCESSING ENVIRONMENT USING A SYNCHRONIZATION COMPONENT

(75) Inventors: Michael M. Behrendt, Randersacker (DE); Gerd Breiter, Wildberg (DE); Joachim Hagmeier, Stuttgart (DE); Einar Lueck, Weil im Schoenbuch (DE); Ruediger Maass, Boeblingen (DE); Steffen Rost, Nufringen (DE); Thomas Spatzier, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1516 days.

(21) Appl. No.: 12/126,654

(22) Filed: May 23, 2008

(65) Prior Publication Data

US 2009/0293064 A1    Nov. 26, 2009

(51) Int. Cl.
 *G06F 9/50* (2006.01)
 *G06F 9/52* (2006.01)

(52) U.S. Cl.
 CPC .............. *G06F 9/5038* (2013.01); *G06F 9/50* (2013.01); *G06F 9/52* (2013.01)

(58) Field of Classification Search
 CPC ............. G06F 9/5038; G06F 9/52; G06F 9/50
 See application file for complete search history.

(56) References Cited

U.S. PATENT DOCUMENTS

| | | | |
|---|---|---|---|
| 5,109,515 A | 4/1992 | Laggis et al. | |
| 5,313,638 A | 5/1994 | Ogle et al. | |
| 5,644,768 A | 7/1997 | Periwal et al. | |
| 5,878,431 A | 3/1999 | Potterveld et al. | |
| 6,105,085 A | 8/2000 | Farley | |
| 6,343,338 B1 | 1/2002 | Reneris | |
| 6,487,455 B1 | 11/2002 | Balasubramanian | |

(Continued)

FOREIGN PATENT DOCUMENTS

| | | |
|---|---|---|
| WO | 199957664 A2 | 11/1999 |
| WO | 2004044742 A2 | 5/2004 |

OTHER PUBLICATIONS

Hollingsworth, D., "Workflow Management Coalition: The Workflow Reference Model", Workflow Management Coalition, Doc. TC00-1003, Iss. 1.1, Jan. 19, 1995.

*Primary Examiner* — David J Huisman
(74) *Attorney, Agent, or Firm* — Patents on Demand, P.A.; Brian K. Buchheit

(57) ABSTRACT

An order processing system can include an order processing container, a factory registry, a relationship registry, and synchronization function component. The order processing system can handle orders, which are build plans including a set of tasks. The tasks can specify programmatic actions which may include creation, deletion, and modification of resources and resource topologies. The order processing container can be central engine that programmatically drives order processing actions. The factory registry can support a creation and deletion of resource instances in a resource topology defined by at least one order. The relationship registry can maintain relationships among resources. The synchronization function component can permit transparent usage of shared resources in accordance with shared usage resource topology parameters specified within processed orders.

19 Claims, 3 Drawing Sheets

(56) References Cited

U.S. PATENT DOCUMENTS

| | | | |
|---|---|---|---|
| 6,625,643 B1* | 9/2003 | Colby et al. | 709/217 |
| 7,587,558 B1* | 9/2009 | Smith et al. | 711/152 |
| 7,644,410 B1* | 1/2010 | Graupner et al. | 718/104 |
| 2002/0161604 A1 | 10/2002 | Kardos et al. | |
| 2003/0101190 A1 | 5/2003 | Horvitz et al. | |
| 2004/0002974 A1 | 1/2004 | Kravitz et al. | |
| 2005/0071843 A1* | 3/2005 | Guo et al. | 718/101 |
| 2005/0204119 A1 | 9/2005 | Saha | |
| 2006/0161516 A1* | 7/2006 | Clarke et al. | 707/2 |
| 2007/0067456 A1 | 3/2007 | Ko | |
| 2007/0081523 A1 | 4/2007 | Mishra | |
| 2007/0107012 A1 | 5/2007 | Rachamadugu | |
| 2007/0239505 A1 | 10/2007 | Shukla et al. | |
| 2008/0021751 A1 | 1/2008 | Behrendt et al. | |
| 2008/0040257 A1 | 2/2008 | Nafeh et al. | |
| 2008/0109806 A1 | 5/2008 | Breiter et al. | |
| 2008/0244595 A1* | 10/2008 | Eilam et al. | 718/104 |
| 2009/0288087 A1* | 11/2009 | Ringseth et al. | 718/102 |

* cited by examiner

SYNCHRONIZING SHARED RESOURCES IN AN ORDER PROCESSING ENVIRONMENT USING A SYNCHRONIZATION COMPONENT

BACKGROUND OF THE INVENTION

The present invention relates to the field of shared resource handling in a service environment, synchronizing shared resources in an order processing environment using a synchronization component.

It can be beneficial to be able to perform systems management for flows in a scope of an entire IT service environment. FIG. 1 (prior art) represents a system 100 for a resource topology that permits system management flows to be created and used. Additional details relating to the structure and implementation specifics of system 100 are disclosed in the cross referenced application entitled "Method and System for Dynamically Creating and Modifying Resource Topologies and Executing Systems Management Flows." Discussions presented herein are a simplification of that topology for purposes of explaining the solution disclosed herein. The system 100 utilizes three abstraction layers including a system management flows layer 120, a system management layer 130, and an IT resources layer 140.

The flows layer 120 can interact with a systems management layer 130, which includes many different resource managers 132-138. These resource managers 132-138 can perform programmatic functions relating to resources of layer 140. These functions can control options of a resource, such as provisioning resources, de-provisioning resources, and otherwise controlling an operation and configuration of a series of resources. Managers 132-138 can include, but are not limited to, network device manager(s) 132, cluster manager(s) 134, storage device manager(s) 135, application manager(s) 136, server manager(s) 137, software image manager(s) 138, and the like. Using system management layer 130 changes can be made relating to the IT resources of layer 140 in a manner transparent to flows layer 120.

The IT resources layer 140 can include a set of computing resources 142-148, which perform computing functions. These resources 140 can be distributed across a network and can conform to numerous different platform specific and/or resource specific standards. Low-level standards of the resources 142-148 can be locally handled, such as by an operating system. The resources 142-148 can conform to numerous standards, which permits the systems manager(s) 132-138 to perform resource functions in a unified manner. For example, each of the resources 142-148 can include an interface and a set of published methods for interacting with the resource 142-148 through the interface. Resources, such as SOA system resources 147 and/or Enterprise Resource Planning (ERP) resources 148 can represent a supersets of component resources, which is able to be controlled and managed through a standardized interface and set of programmatic calls. An actual complexity of each resource 142-148 is arbitrary and each can be managed and controlled by one or more managers 132-138. The resources 142-148 can include, but are not limited to application resource(s) 142, storage device resource(s) 144, Web 2.0 system resource(s) 145, DB management system resource(s) 146, SOA system resource(s) 147, Enterprise Resource Planning (ERP) system resources, and the like.

The system management flows layer 120 can handle various flows 122-126 at a flow level. In one embodiment, each flow 122-126 can be associated with a flow order, which includes a number of discrete tasks (e.g., Tasks A, B, C, . . . N) that are to be conducted. On or more workflow engines 128 of layer 120 can ensure that each task is performed in accordance with tasks specifics. That is, from a management perspective, interactions for flows 122-126 can occur at a flow level by interacting with engines 128. In system 100, it is advantageous to maintain layer 130 as a layer of abstraction between layer 120 and layer 140, since it permits consistent handling of tasks in a resource 142-148 independent manner. Actual resources 142-148 utilized to handle discrete tasks and details therein can vary to an arbitrary extent, without affecting operations of work flow engine 128.

One heretofore unresolved challenge with system 100 relates to the concurrent handling of shared resources 142-148. That is, IT resources 142-148 may be concurrently used by two or more flows 122-126 executing in parallel. Present designs of system 100, therefore, often place a resource synchronization burden on a flow 122-126 designer. A designer of a flow 122-126 can therefore not just concentrate on application aspects of the flow, which is one significant benefit of system 100 over traditional work flow implementations. Further, an error in critical sections of flow 122-126 code can influence concurrent flows waiting to access a shared resource (through manager 132-138 exposed functions).

BRIEF SUMMARY OF THE INVENTION

An order processing system that includes an order processing container, a factory registry, a relationship registry, and a synchronization function. The order processing container can be a central engine that programmatically drives order processing actions for a set of discrete orders. The order processing actions can be programmatic actions performed responsive to an order. An order can be a build plan including a series of tasks. Tasks can specify programmatic actions which may include creation, deletion, and modification of resources and resource topologies. The factory registry can support a creation and deletion of resource instances in a resource topology defined by at least one order. The relationship registry can maintain relationships among resource instances of resource topologies defined by at least one order. The synchronization function component can permit transparent usage of shared resources in accordance with shared usage resource topology parameters specified within processed orders. The synchronization function component can support concurrent processing of orders in accordance with the shared usage resource topology parameters.

The order processing container, the factory registry, the relationship registry, and the synchronization function can be configured to process at least three different type of orders. These order types can include initial orders, modification orders, and termination orders. Initial orders can contain tasks for building up an initial resource topology. Modification orders are processed on resource topologies that have been initialized by an initial order and may result in a change to the resource topology. Termination orders terminate all management actions relating to a resource topology, which can result in a deconstruction of the resource topology.

In one embodiment, the synchronization function component can be configured to support at least one standardized resource topology action related to shared resources. Standardized resource topology actions can include a bindOrcreate action and an unbindOrdelete action. A bindOrcreate action can be a programmatic action that defines a connection of a flow specific resource identifier with a shared resource. The unbindOrdelete action can be a programmatic action that disconnects a flow specific resource identifier with the shared resource.

In one embodiment, the synchronization function component can be configured to utilize a synchronization scope value, which affects whether shared resources permit orders to be concurrently processed. Configurable values for the synchronization scope can include: All, BindAndUnbind, and None. The synchronization function component can ensure that orders processed on shared resources are synchronized and exclusive access to the shared resource is provided to each order when a synchronization scope value is set to All. When a synchronization scope value is set to BindAndUnbind, the synchronization function component can ensure that orders processed on a shared resources are synchronized and exclusive access is only guaranteed for orders that create or delete a relationship of the shared resource—other orders can be permitted to be concurrently executed by the shared resource.

DETAILED DESCRIPTION OF THE INVENTION

Figure 1:
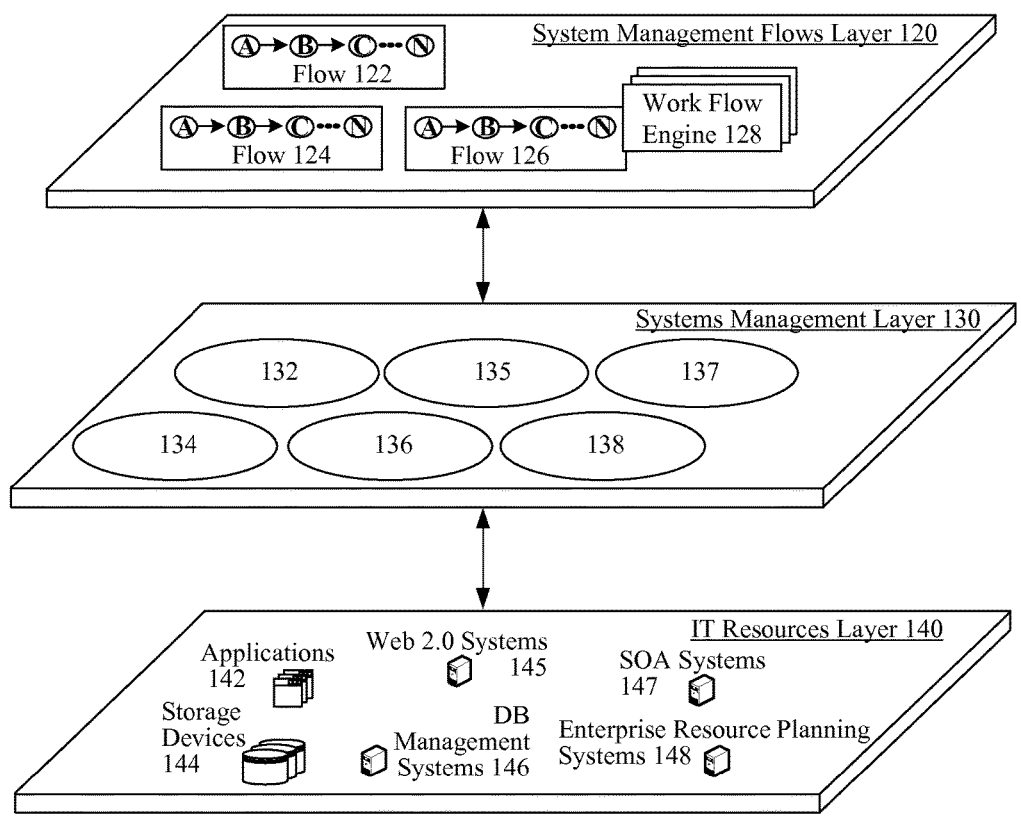
FIG. 1 (prior art) represents a system for a resource topology that permits system management flows to be created and used.

The present invention extends an order processing environment (i.e., an information technology service environment capable of handling system management flows, which can each include a set of tasks implemented in a resource abstracted fashion) to include a synchronization function component. This component is designed to interact with other key components of the order processing environment, such as an order processing container, a factory registry, and a relationship registry. The order document within a system management flow can specify details of a sequence of tasks needed for that order and any dependency issues relating to ordering and processing of these tasks. The synchronization function component can process the order document details and perform programmatic actions, dynamically derived from the resource model, needed to synchronize the tasks relative to each other. Thus, flows and flow tasks can be synchronized without reliance on flow level code.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
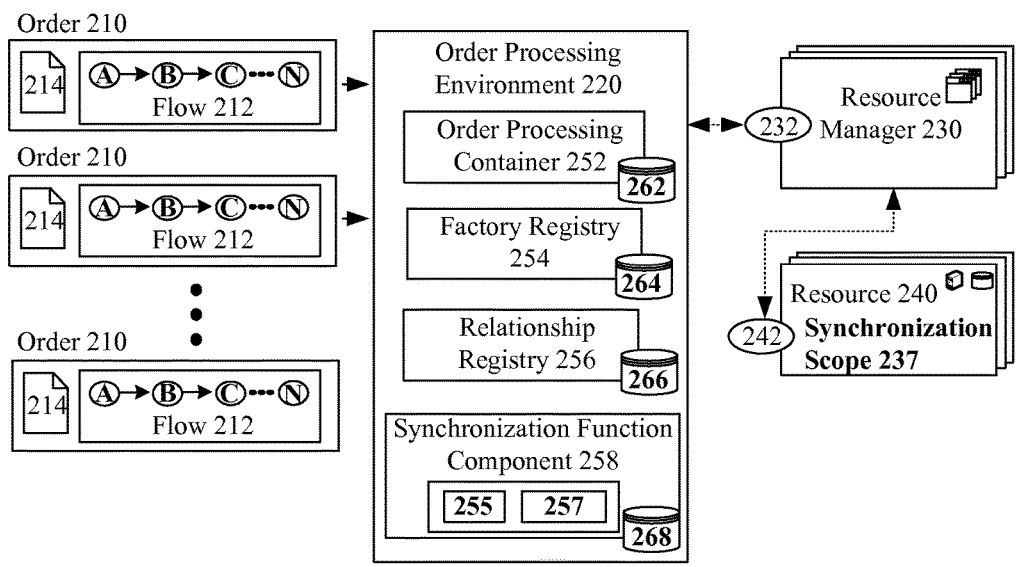
FIG. 2 is a schematic diagram of an information technology service environment which includes a synchronization component for handling orders in accordance with an embodiment of the inventive arrangements disclosed herein.
Figure 2:
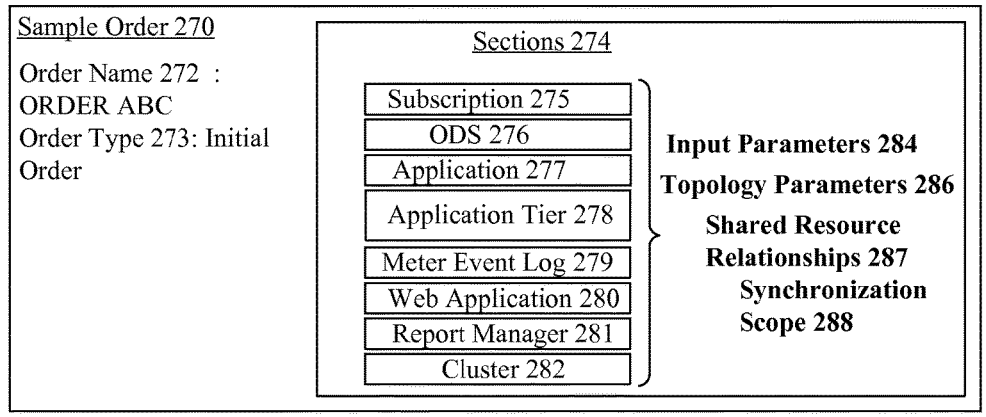

FIG. 2 is a schematic diagram of an information technology service environment which includes a synchronization function component 258 for handling orders 210 in accordance with an embodiment of the inventive arrangements disclosed herein. The order processing environment 220 is able to currently process multiple orders 210 using one or more work flow engines. Each order 210 can include an order document 214 and a flow 212. The flow 212 can be a sequence of discrete tasks that are to be performed. Tasks are handled by a resource manager 230, which acquires and manages the necessary resources 240. The synchronization function component 258 can perform synchronization functions for the workflow engine(s) of the order processing environment 220. Because of component 258, explicit synchronization handling does not have to be defined in the definitions and/or code of the workflows 212.

The order 210 can be considered a build plan, which includes the required parameters and topology actions for the involved resources 240 of a work flow 212. The work flow engines inspect each order 210 and derive a set of actions for achieving an overall programmatic goal, thereby causing workflows 212 to be executed. Execution of orders 210 can be handled within an order processing environment, which can be abstracted from an actual set of resources 240 that perform programmatic actions. That is, the work flow engine can exchange data through an interface 232 with one or more resource managers 230. The managers 230 can exchange data through an interface 242 with one or more resources 240.

As used herein, a flow 212 is a series of steps (herein called tasks), which are required to complete a transaction. In one embodiment, a flow 212 can be a business process based upon one or more Web services. That is flow 212 can utilize a set of Web service interfaces to import and export functionality. Flows 212 can be defined using standardized software languages, such as the Web Services Business Process Execution Language (WS-BPEL), which is an Organization for the Advancement of Structured Information Standards (OASIS) standard.

WS-BPEL is just one language for programmatically specifying flows 212 and the invention is not to be construed as limited in this regard. For example, flows 212 can be specified using a Business Process Modeling Notation (BPMN), a Web Services Conversation Language (WS-CDL), XML Process Definition Language, a Service-Oriented Modeling Framework (SOMF) language, a Web Services Flow Language (WSFL), XLANG or other extension of Web Services Description Language, and the like.

Generally, a flow 212 is an artifact resulting from "programming in the large" which requires building abstractions, which are able to for an architecture unlikely to be often changed. That is, flows 212 can represent a set of publicly observable behaviors represented in a standardized fashion. In this case, the flow 212 represents an abstracted IT computing environment consisting that utilizes a plurality of non-abstracted IT resources 240. That is, a flow 212 can allocate, de-allocate, and otherwise configure the set of system management resources in the abstracted IT environment. Programming in the large can be contrasted with programming in the small, which deals with short-lived programmatic behavior, often executed as a single transaction and involving access to local logic and resources, such as files, databases, etc. Resources 240 leveraged by the flows 212 are generally "programmed in the small".

The order processing environment 220 can be any environment able to execute the flow 212. In a WS-BPEL based environment, where Web services are utilized as interfaces to import and export functionality, the environment 220 can be a Web service environment. Environment 220 can include, but is not limited to, a service oriented architecture (SOA) environment, a Web Service Execution Environment (WSMX), a Semantic Web services (SWSs) environment, Open Grid Services Infrastructure Working Group (OGSI WG) based environment, and the like. The order processing environment 220 can utilize standardized technologies to facilitate data exchange, such as Service Oriented Architecture Protocol (SOAP), Universal Description, Discovery and Integration (UDDI), Web Service Description Language (WSDL), Common Object Request Broker Architecture (CORBA), .NET technologies, etc.

Environment 220 includes order processing container 252, relationship registry 254, factory registry 256, and synchronization function component 258. Each component of environment 250 can be associated with a component specific data store 260-268, which can be a persistent memory store able to store digitally encoded data. The components 250-258 create, destroy, and utilize resources 240.

The order processing container 252 is a central engine or node of the environment 220 that drives order 212 processing actions. The factory registry 254 supports the creation and deletion of new resource instances. The relationship registry 256 stores and maintains relationships between resources. The synchronization component 258 implements a synchronization mechanism which restricts/enables parallel processing of orders 212 based upon order specific information 214.

An order 210 can be defined as a software artifact (e.g., an XML document for example) that defines a number of tasks (flow 212) and information 214 concerning a handling of these tasks and/or the flow 212 in general. Stated differently, an order 210 can be considered a build plan, which incorporates the required parameters and topology actions for the involved resources 240.

Three types of orders 210 can exist in system 200, which include initial orders, modification orders, and termination orders. Initial orders can contain tasks for building up an initial resource topology. Modification orders can be processed on resource topologies that have been initialized by an initial order. A termination order can be a last order that can be applied to a resource topology, which terminates all management actions relating to the resource topology and then disposing of the topology.

Orders 210 are "passed" along the resources 240. In one embodiment, this "passing" can be sequential, where the order 210 is effectively a token passed among a set of resources 240 causing each "token" possessing resource to perform programmatic actions defined within the order 210. Each resource 240 inspects the order 210, and derives its actions for achieving the overall goal. If the processing container 252 has passed the order 210 to all resources 240, the so-called request path is terminated, and the response path is entered. In the response path, the processing container 252 queries its internal stack for traversing through all resources 240 the processing container 252 has called before in reverse order.

State for the flow 212 is maintained within an order 210. As shown in sample order 270, each order can store information, such as an order name 272, an order type 273, and can include a number of information sections 274. Each section 274 can include resource specific data for resources 240 of the flow 212. Sections 274 can include a subscription section 275, an OSD section 276, an application section 277, and application tier section 278, a meter event log section 279, a Web application section 280, a report manager section 281, a cluster section 282, and the like. Specifics of these sections are elaborated upon more fully in cross referenced application entitled "Method and System for Dynamically Creating and Modifying Resource Topologies and Executing Systems Management Flows" incorporated by reference herein.

Each section 274 can include input parameters 284 and topology parameters 286 that describes a set of relationships and resources that are to be created, deleted, and otherwise utilized when processing flow 212 tasks. The topology parameters 284 can include information used by the synchronization function component 258, 258 to ensure resource 240 are properly synchronized.

The relationship registry 256 stores relationships between resources, which includes relationships relevant to synchronization. In one embodiment, each relation stored in the registry 256 can have multiple attributes. These attributes can include, for example, a sourceHandle (pointer to a first resource in a relation), a targetHandle (pointer to a second resource in a relation), a sourceRole (role of the first resource), a targetRole (role of the second resource), and an optional relationName. Roles can include a role for an order handler component (H) and a role for an order processing component (P). Valid combinations of (sourceRole, targetRole) can include (P,P), (P,H), and (H,H), where the combination of (H,P) is invalid.

Two topology actions performed by synchronization function component 258 involving an order 210 can include a bindOrcreate action 255 and an unbindOrDelete action 257. These actions 255, 257 relate to shared resources, which are resources 240 shared between two or more orders 210 or used by two or more flows 212 of different IT Service Environments.

The topology action bindOrCreate 255 defines a connection of a resource X to the shared resource with specific properties (stored as topology parameters 286 as a shared resource relationship 287). If a shared resource cannot be found, then a new instance of the shared resource can be created. When a new relation with the reserved relation name "is RepresentedBy" is created that connects the resource X with the shared resource.

The topology action unbindorDelete 257 removes a connection between resource X and the related target shared resource with specific properties, which can be defined by a query in the topology action definition (stored in parameters 286). Isolated shared resources with no connection to other resources are automatically deleted (by synchronization function component 258).

In one embodiment, a definition associated with a shared resource can be extended to include a synchronization scope 288. Values for synchronization scope 288 can include All, BindAndUnbind, and None.

The synchronization scope 288 value All can define default behavior, which is used when no scope definition is present. When scope 288 is set to All, orders 212 processed on the shared resource are synchronized and exclusive access to the Shared Resource is provided for each order 212. Hence, at each time only one order 210 can be processed on the shared resource.

The synchronization scope 288 value BindAndUnbind, exclusive access is only guaranteed for orders 210 that actually create or delete a relationship to the shared resource. Hence, more than one order 210 can be processed at a time, but only if all of these orders 210 require a none-exclusive access. The rational behind the BindAndUnbind scope value is twofold. First, the throughput in the order 210 processing of environment 220 is increased by allowing more than one order 210 to be processed at a time. Second, all orders 210 that actually modify the resource topology are isolated against each other. This guarantees that an order 210 being processed on a shared resource and the corresponding subtree works on the same resource topology for the time of its order 210 processing because no topology changes of other orders 210 are allowed.

The synchronization scope 288 value None specifies that no order 210 synchronization is required at all. This scope value may be used for shared resources where the parallel execution of orders is not critical, or where other precautions (e.g. own synchronization logic in the task implementation working on the shared resource) are made to avoid problems when running orders 210 in parallel.

In one embodiment, synchronization scope can be defined at both an order 210 and at a resource 240 (shown as scope 237) level. The resource level scope 237 can be a default value for a given resource. The order 212 defined scope 288 can overrule the "global" synchronization scope 236 defined for a shared resource. This overruling can be limited to situations when the value of scope 237 is set to All. That is, orders 210 may weaken the global scope for its own order processing to none (which means that this order 212 can be processed on the Shared Resource together with other orders 212 requiring also only none-exclusive access). Also, orders 212 may be specified as friends to other orders 212, which enables the container 252 to process those orders 210 concurrently.

Figure 3:
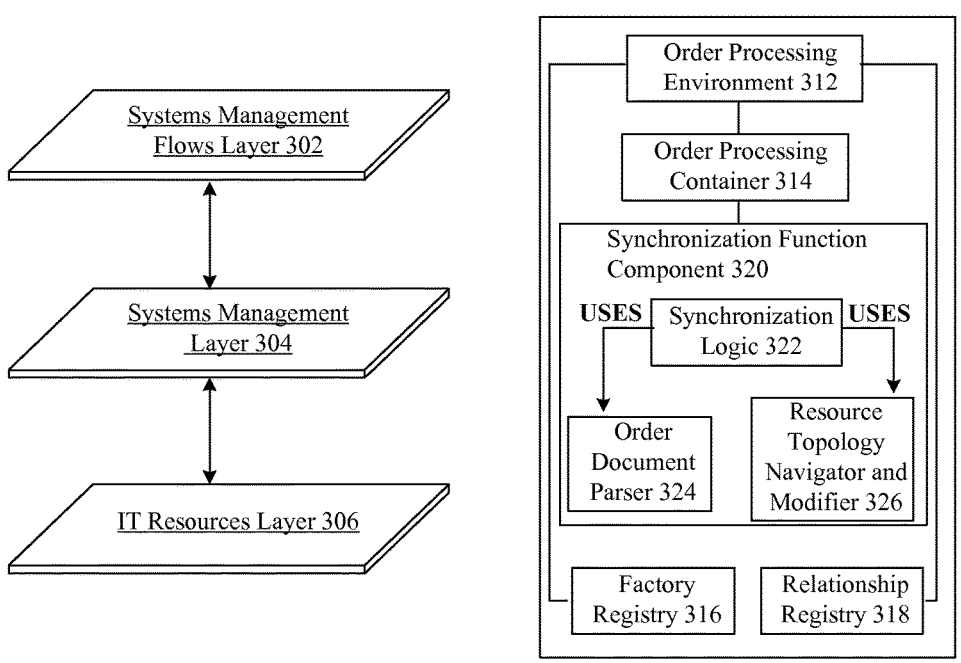
FIG. 3 is a schematic diagram of an order processing environment that includes a synchronization function component in accordance with an embodiment of the inventive arrangements disclosed herein.
Figure 3:
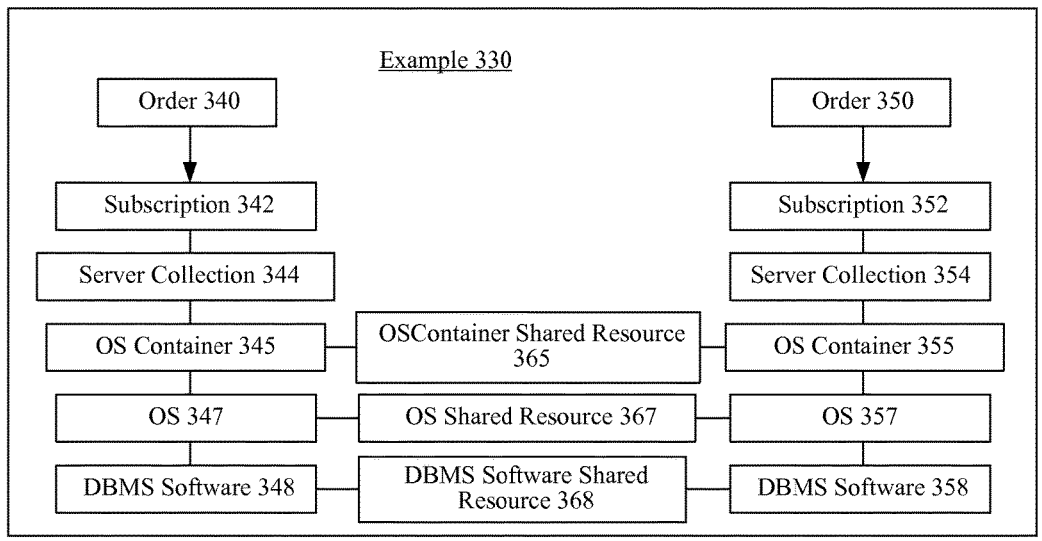

FIG. 3 is a schematic diagram 300 of an order processing environment that includes a synchronization function component 320 in accordance with an embodiment of the inventive arrangements disclosed herein. The processes and flows of diagram 300 can be implemented in context of system 200.

In diagram 300, a systems management flow layer 302 communicates to a systems management layer 304, which communicates to an IT resource layer 306. An order processing environment 312 resides and operates at the systems management flows layer 302. The order processing environment 213 can include an order processing container 314, a factory registry 316, a relationship registry 318, and a synchronization function component 320. Specifics for components 312-318 are elaborated upon more fully in cross referenced application entitled "Method and System for Dynamically Creating and Modifying Resource Topologies and Executing Systems Management Flows" incorporated by reference herein.

The synchronization function component 320 can include synchronization logic 322, a resource topology navigator and modifier 326, and an order document parser 324. The synchronization function component 320 can be called for life cycle support of shared resources as well as for synchronizing orders being processed on shared resources.

For life cycle support, the synchronization function component (SFC) 320 can be called by the container 314 in a request path if a resource topology section (e.g., sections 274) is included for the Vresource to be called next. The order document and the Resource Handle (pointer to a resource) of the resource can be provided as arguments by the container 314 to the SFC 320.

The synchronization logic 322 of the SFC 320 can initialize a stateful synchronization operation for determining whether the resource topology sections contains the topology action bindOrCreate. The order document parser 324 can be used to find the appropriate topology definition in the order document. If defined, the SFC 322 will use its resource topology modificator 326 which in turn interacts with the relationship registry 318 and the factory registry 316 to create a new shared resources instance (if not already present) and a new relationship (named 'is RepresentedBy') between the resource specified by the provided Resource Handle and the shared resource. If a new instance of a shared resource is created, the SFC 320 can also create the control structures required for the synchronization of orders being processed on the shared resource. Finally, control is given from component 320 to the container 314.

In one embodiment, the complete life cycle of shared resources can be maintained by the SFC 320. The SFC 320 can create shared resource as well as all relationships referencing shared resources, as defined in the Topology section of the order document. It can also deletes existing relationships from resources to a shared resource if specified in the topology section of the order document. If the last relationship to the shared resource is deleted, the shared resource is destroyed as well and its corresponding control structures are cleaned up. During the lifecycle of a shared resource, the SFC 320 manages the order synchronization on it, using the information stored in the relationship registry 318 and its own internal control structures.

In one embodiment, the SFC 320 can be called by the container both in the Request and Response Path for synchronization support. In the Request Path, the SFC 320 is called by the container 314 during the order processing before the order document is delegated to the next resource. The order document, and the Resource Handle of the resource that is to be called next are provided as arguments by the container 314 to the SFC 320. The synchronization logic 322 of the SFC 320 uses its resource topology navigator 326 which in turn interacts with the relationship registry 318 to check whether the resource specified by the Resource Handle is related to a shared resource. If no relation exists, the SFC 320 can finish processes and can transfer control back to the container 314.

If a relation exists, the SFC 320 can initialize a stateful synchronization operation for synchronizing this order against potential orders already running at this time. For this purpose SFC 320 can use its internal control structures that store the list of processing and waiting orders on the shared resource. When the list of processing orders is empty, the current order can be allowed to be processed immediately. Otherwise, the current order can be added to the list of waiting orders for later processing. Once the decision is made and the internal control structures are updated accordingly the SFC 320 can transfer control to container 314. When the order has been queued for waiting by the SFC 320, programmatic logic of the container 314 can elect to not delegate the order to the next resource.

In the Response Path, the SFC 320 can be called by the container 314 during the order processing after the order document was conveyed to the container 314 by a resource. The order document, and the Resource Handle of the component that has just finished its order processing can be provided as arguments by the container 314 to the SFC 320. The synchronization logic 322 can use resource topology navigator 326 which in turn interacts with the relationship registry 318 to check whether the resource specified by the Resource Handle is related to a Shared Resource. If no relation exists the SFC 320 can finish processing and can transfer control to the container 314.

If a relation exists, the SFC 320 can initialize a stateful synchronization operation for synchronizing this order against potential orders that are already running. The SFC 320 can uses its internal control structures that stores the list of processing and waiting Orders on the Shared Resource when performing the synchronization operation. The SFC 320 can removes the order from the list of processing orders when the order processing on the shared resource and the corresponding subtree has finished. The list of waiting orders can be used to identify orders that are currently waiting to be processed on the shared resource. If available, the first order in the list can be identified and provided to the container 314 for further processing. The internal control structures are updated accordingly. If the first order requires only non-exclusive access on the shared resource, then the SFC also inspects the following orders in the list of waiting orders and also provides all further orders requiring non-exclusive access to the container 314 for processing. In this manner, one or more waiting orders are activated for further processing.

Example 330 shows a resource topology for two different orders 340 and 350. Order 340, 350 can subscribe 342, 352 to a set of resources. Subscriptions 342, 352 can each represent a subscription for a service, such as a Web service. The subscriptions can use resources of a set of servers 344, 354. These servers 344, 354 can include an operating system container 345, 354 containing an operating system 347, 357. The operating system containers 345, 354 provide flexibility of handling situations with virtual operating systems, operating systems executing on virtual machines, distributed operating systems, and the like. Database Management System (DBMS) Software 348, 358 can execute on the operating systems 347, 357.

In one embodiment, each order 340, 350 can include a business flow for providing in-house IT services for two different departments. Each order 340-350 can be hosted/consist of a different set of IT resources, mainly the collection of servers 344, 354 used and the software stack installed on each of the servers 344, 354 (e.g., operating system 347, 357 and application software 348, 358). The flows within the orders 340, 350 can provide services to provision new application servers for an ERP system.

Both orders 340, 250 share a common set of resources, namely the OSContainer 345, 355 (server), the OS 347, 357 (operating system) and the DBMS Software 348, 358. Shared resources can be established for each, shown by OS container shared resource 365, OS shared resource 367, and DBMS software shared resource 368.

Although the orders 340, 350 manage different ERP systems, both can be allowed to use the same physical server box to provision the DBMS server. If the operating system and the base database management system software is already installed on that server, the System Management Flow will leave this installation untouched and perform only the necessary steps to create an additional DBMS instance for the corresponding ERP system. Otherwise, the steps to install the operating system and the base database management system software are performed as well by the System Management Flow.

The Resource Topology of both orders 340, 350 contains its own resources for OSContainer 345, 355, OS 347, 357, and DBMS Software 348, 358, which reflect only the operational aspects of the underlying IT Service Environment (e.g. installing the operating system and DBMS software) and the resource instance specific properties (e.g. for DBMS credential and license data). The OSContainer 365, OS 367, and DBMS Software Shared Resources 368 represent the real resources shared between both orders 340, 350. Resources 365, 367, 368 are referenced from both resource topologies of the two orders 340, 350. That is, processes specific to order 340 reference and are concerned with resources 345-348 and resources 365-368. Similarly, processes of order 350 reference resources 355-358 and resources 365-368. In one embodiment, all operations delegated to the shared resources 365-368. In another embodiment, operations are mainly performed by the resources 345-348 and 355-358, respectively. In this embodiment, the shared resources are mainly used for synchronization purpose and for storing state information of the underlying real IT resources. Synchronization overhead is handled by SFC 320.

The diagrams in FIGS. 2-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An order processing system comprising:
one or more processors;
one or more non-transitory computer-readable storage devices;
program instructions, which are stored on the one or more non-transitory storage devices for execution by the one or more processors causing the one or more processors to carry out operations defined by the program instructions;
an order processing container comprising at least a subset of the program instructions that, upon being executed by the one or more processors, drives order processing actions for a plurality of discrete orders, wherein the order processing container sequentially passes each of the discrete orders over a network to a plurality of different resources, wherein the order processing container maintains an internal stack for sequentially traversing the different resources while abstracting specifics of the different resources being utilized to process the discrete orders, wherein each of the plurality of discrete orders is a document that comprises an order name, an order type, a flow section, and an order information section, wherein the flow section defines a flow of a sequence of unique tasks to be conducted in a sequential task order defined by the flow section, wherein the sequence of tasks of the flow is to be performed by the different resources to which the respective discrete order is passed, wherein each of the discrete orders maintains state for the flow defined within the document of the respective discrete order, wherein the order information section includes input and topology parameters that describe computing resources and relationships to be created, deleted, and utilized when processing tasks of the flow defined by the respective discrete order, wherein the topology parameters comprise a synchronization scope value; and a synchronization function component comprising at least a subset of the program instructions that upon being executed by the one or more processors permits transparent usage of shared ones of the different resources in accordance with shared usage resource topology parameters specified within a subset of the discrete orders involved in usage of the shared ones of the different resources at any point in time, wherein the synchronization function component supports concurrent processing of the subset of the discrete orders and supports a guarantee of non-concurrently processing of the subset of the discrete orders, depending on values stored within the synchronization scope value of respective ones of the subset of the discrete orders.

2. The order processing system of claim 1, wherein the synchronization function component is configured to support standardized resource topology actions related to the shared ones of the different resources, wherein said standardized resource topology actions comprise a bindOrcreate action and an unbindOrdelete action, wherein the bindOrcreate action is a programmatic action that defines a connection of a flow-specific resource identifier of a related flow stored within a corresponding one of the discrete orders with one of the shared ones of the different resources to which the bindOrcreate action applies, wherein the unbindOrdelete action is a programmatic action that disconnects a flow specific resource identifier of a related flow stored within a corresponding one of the discrete orders with one of the shared ones of the different resources.

3. The order processing system of claim 1, wherein the synchronization scope value of each of the discrete orders consists of All, BindAndUnbind, or None.

4. The order processing system of claim 1, further comprising:
a factory registry comprising at least a subset of the program instructions that upon being executed by the one or more processors supports a creation and deletion of resource instances of the different resources as defined by the topology parameters of the order information section of respective ones of the discrete orders.

5. The order processing system of claim 1, further comprising:
a relationship registry comprising at least a subset of the program instructions that upon being executed by the one or more processors maintains relationships among resource instances of the different resources as defined by the topology parameters of the order information section of respective ones of the discrete orders.

6. The order processing system of claim 1, wherein the synchronization function component enables the order processing system to perform the synchronization function without requiring explicit synchronization handling to be defined in code of the flow of the subset of discrete orders.

7. The order processing system of claim 1, wherein for each of the discrete orders, the flow utilizes a set of Web service interfaces to import and export functionality for the sequence of unique tasks.

8. The order processing system of claim 1, wherein one established value for the synchronization scope value ensures that one of the different resources that modifies a resource topology of a potentially shared one of the different resources is isolated from all other ones of the different resources with regard to concurrently sharing of the different resources per the synchronization function component.

9. The order processing system of claim 1, wherein the flow as defined within a portion of the different resources utilizes a set of Web interfaces defined within the flow to import and export functionality for specific ones of the unique tasks.

10. The order processing system of claim 1, wherein the flow is defined within respective ones of the discrete orders using a Web services business process execution language (WS-BPEL).

11. A system comprising:
one or more processors;
one or more non-transitory computer-readable storage devices;
program instructions, which are stored on at least one of the one or more non-transitory computer-readable storage devices for execution by at least one of the one or more processors;
an order processing container, comprising a portion of the program instructions, configured to be a central engine that programmatically drives order processing actions for a plurality of discrete orders, wherein the order processing container sequentially passes each of the discrete orders over a network to a plurality of different resources, wherein the order processing container maintains an internal stack for sequentially traversing the different resources while abstracting specifics of the different resources being utilized to process the discrete orders, wherein each of the plurality of discrete orders is a document that comprises an order name, an order type, a flow section, and an order information section, wherein the flow section defines a flow of a sequence of unique tasks to be conducted in a sequential task order defined by the flow section, wherein the sequence of tasks of the flow is to be performed by the different resources to which the respective discrete order is passed, wherein each of the discrete orders maintains state for the flow defined within the document of the respective discrete order, wherein the order information section includes input and topology parameters that describe computing resources and relationships to be created, deleted, and utilized when processing tasks of the flow defined by the respective discrete order, wherein the topology parameters comprise a synchronization scope value; and
a synchronization function component, comprising a portion of the program instructions, that supports concurrent processing of a subset of the discrete orders and supports a guarantee of non-concurrently processing of the subset of the discrete orders, depending on values stored within the synchronization scope value of respective ones of the subset of the discrete orders.

12. The system of claim 11, wherein each of the discrete orders is one of three types of orders consisting of an initial order type, a modification order type, and a termination order type, wherein initial ones of the discrete orders having the initial order type contain tasks for building up an initial resource topology, wherein modification ones of the discrete orders having the modification order type are processed on resource topologies that have been initialized by one of the initial orders and result in a change to a respective one of the resource topologies, and wherein termination ones of the discrete orders having the termination order type terminate all management actions relating to defined resource topology.

13. The system of claim 11, further comprising:
a factory registry, comprising a portion of the program instructions, configured to support a creation and deletion of resource instances in a resource topology defined by at least one of the discrete orders.

14. The system of claim 11, further comprising:
a relationship registry, comprising a portion of the program instructions, configured to maintain relationships among resource instances of resource topologies defined by at least one of the discrete orders.

15. The system of claim 11, wherein for each of the discrete orders, the flow utilizes a set of Web service interfaces to import and export functionality for the sequence of unique tasks.

16. The system of claim 11, wherein one established value for the synchronization scope value ensures that one of the different resources that modifies a resource topology of a potentially shared one of the different resources is isolated from all other ones of the different resources with regard to concurrently sharing of the different resources per the synchronization function component.

17. The system of claim 11, wherein the synchronization function component is configured to support standardized resource topology actions related to shared resources, wherein said standardized resource topology actions comprise a bindOrcreate action and an unbindOrdelete action, wherein the bindOrcreate action is a programmatic action that defines a connection of a flow-specific resource identifier of a related flow stored within a corresponding one of the discrete orders with a shared one of the different resources to which the bindOrcreate action applies, wherein the unbindOrdelete action is a programmatic action that disconnects a flow-specific resource identifier of a related flow stored within a corresponding one of the discrete orders with the shared one of the different resources.

18. The system of claim 11, wherein the flow of the discrete orders is defined within respective ones of the discrete orders using a Web services business process execution language (WS-BPEL).

19. The system of claim 11, wherein the flow is written in the document of corresponding ones of the discrete orders in one of a Business Process Modeling Notation (BPMN), a Web Services Conversation Language (WS-CDL), XML Process Definition Language, a Service-Oriented Modeling Framework (SOMF) language, and a Web Services Flow Language (WSFL).

* * * * *